Figure 1:
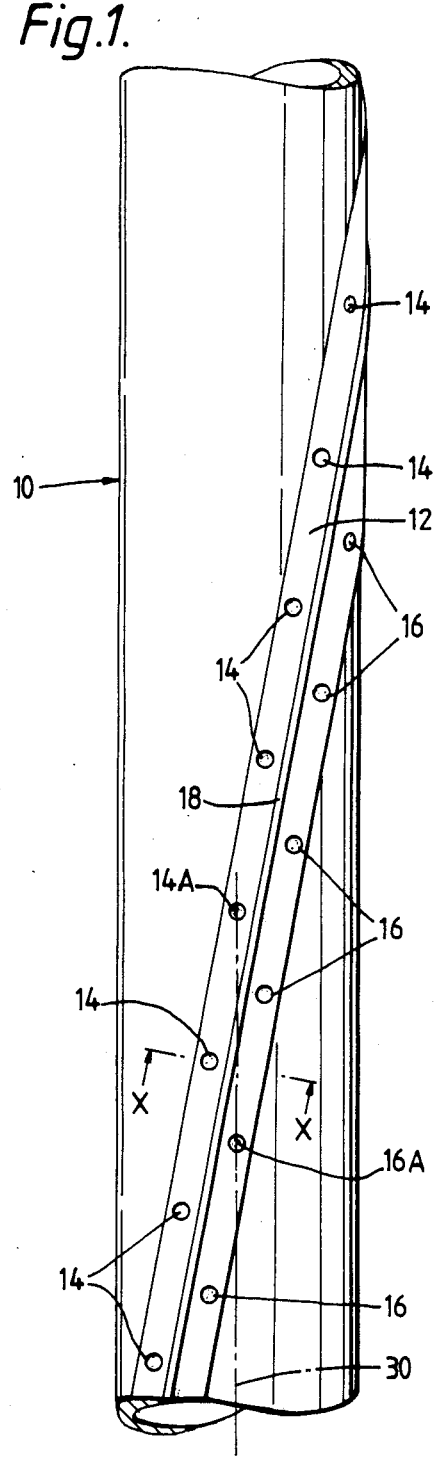

United States Patent [19]

Swanson

[11] Patent Number: 4,968,480

[45] Date of Patent: Nov. 6, 1990

[54] NUCLEAR REACTOR FUEL ELEMENTS

[75] Inventor: Kenneth M. Swanson, Thurso, United Kingdom

[73] Assignee: United Kingdom Atomic Energy Authority, London, England

[21] Appl. No.: 303,242

[22] Filed: Jan. 30, 1989

[30] Foreign Application Priority Data

Mar. 7, 1988 [GB] United Kingdom ............. 8805365

[51] Int. Cl.⁵ .................................... G21C 3/32
[52] U.S. Cl. ................................ 376/436; 376/434
[58] Field of Search ......................... 376/434, 436

[56] References Cited

U.S. PATENT DOCUMENTS

| 3,930,940 | 1/1976 | Cayol | 376/436 |
| 3,944,468 | 3/1976 | Duret | 376/436 |
| 4,005,521 | 2/1977 | Kaplan | 29/469 |
| 4,038,138 | 7/1977 | Linning | 376/436 |
| 4,235,673 | 11/1980 | Mordarski | 376/436 |
| 4,587,092 | 5/1986 | Feutrel | 376/438 |
| 4,654,193 | 3/1987 | Amano | 376/436 |

FOREIGN PATENT DOCUMENTS 2059139 5/1971 France.
1450878 9/1974 United Kingdom.

OTHER PUBLICATIONS

Derwent Abstract of FR 2059139.

Primary Examiner—Donald P. Walsh
Attorney, Agent, or Firm—William R. Hinds

[57] ABSTRACT

A nuclear reactor fuel element is helically wound with a strip which on one face at regular intervals along its length has dimples, and has a continuous rib on the opposite face. The strip contacts the associated fuel pin cladding via the dimples which effectively act as point contacts, and it contacts the neighboring fuel pins via the rib which also provides point contact. The regions between adjacent dimples are clear of the cladding and provide coolant flow paths thereby avoiding stagnant regions. The dimples may be arranged in two staggered sets one on each side of a central rib, and the strip then wound so that the dimples in each set each align axially with a respective dimple of the other set.

5 Claims, 1 Drawing Sheet

U.S. Patent    Nov. 6, 1990    4,968,480

NUCLEAR REACTOR FUEL ELEMENTS

This invention relates to nuclear fuel elements and is particularly concerned with fuel elements of the type comprising a tubular cladding enclosing nuclear fuel (which may be fissile and/or fertile), the fuel elements being arranged in parallel spaced relation to form a fuel sub-assembly which may include a housing or wrapper enclosing the fuel elements.

The invention has a specific application to the type of fuel sub-assemblies employed in fast neutron nuclear reactors in which the heat generated by the fuel elements is transferred to a liquid metal coolant which flows through the sub-assembly. In one known fast neutron reactor design, spacing between the fuel elements is created by helically wrapping a length of wire around the cladding of each fuel element. A disadvantage with this method of spacing the fuel elements is that a region of stagnant coolant tends to collect underneath the wires and because heat transfer is less effective in such regions, hot spots tend to develop and, as a consequence, a limitation is placed on the maximum temperature at which the fuel element can operate without leading to problems.

According to the present invention there is provided a nuclear reactor fuel element which is helically wrapped with a strip, the strip having on the face presented towards the fuel element, spacer dimples which contact the cladding of the fuel element at positions spaced around the circumference of, and spaced axially of the fuel element, and the strip having on the face presented away from the fuel element a rib for contact with cladding of neighbouring fuel elements.

Preferably, the rib is located intermediate the edges of the strip and the dimples are arranged in two series of dimples one on each side of the strip.

The dimples in each series are preferably spaced apart at a regular pitch, and the dimples in one series may be staggered relative to the dimples in the other series in a direction lengthwise of the strip, the stagger conveniently being such that, with the strip wrapped around the element, dimples on opposite sides of the rib are aligned with one another axially of the fuel element.

Figure 2:
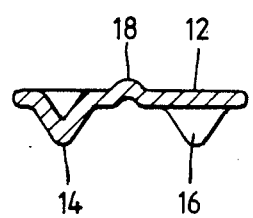

To promote further understanding of the invention, one embodiment will now be described by way of example only with reference to the accompanying drawings, in which:

FIG. 1 is a fragmentary view of part of a fuel element or pin of a sodium-cooled fast neutron reactor sub-assembly; and FIG. 2 is a sectional view in the direction X—X in FIG. 1 showing the cross-sectional configuration of the helically-wrapped strip.

The fuel element 10 typically comprises a tubular stainless steel cladding enclosing a column of nuclear fuel material in the form of pellets. A fuel sub-assembly for a fast neutron reactor typically comprises a hexagonal array of such fuel elements all located in spaced parallel relation with one another within a steel wrapper which over the major part of its length is of hexagonal cross-section In accordance with the present invention, the desired spacing between neighbouring fuel elements of the array is obtained by helically wrapping each fuel element with a strip 12 the ends of which may be anchored to opposite ends of the fuel element. The strip 12, which may be of stainless steel, is formed with two series of dimples 14, 16 alongside each of its edges, the dimples 14, 16 being staggered relative to one another as shown so that each dimple 14 is substantially aligned with a respective dimple 16 in the axial direction of the fuel element (see for examples dimples 14A and 16A—the line 30 joining them is parallel to the axis of the element 10). The dimples 14, 16 contact the cladding at regular intervals spaced both axially and circumferentially of the fuel element. Thus, the dimples 14, 16 contact the cladding at regular intervals spaced both axially and circumferentially of the fuel element and lift the body of the strip away from the cladding to reduce the tendency for stagnant regions of coolant to form, and the axial alignment of the dimples 14, 16 (achieved by staggering) assists in reducing drag and stagnation under the strip 12. Midway between its edges, the strip 12 is formed with a continuous, outwardly projecting rib 18 having a convex profile. This rib serves to minimise contact between the strip 12 and the cladding of neighbouring fuel elements, ie the strip of each fuel element contacts its neighbouring fuel elements with point contact through the agency of the rib 18.

Advantages of the dimpled strip spacer illustrated include:

1. Elimination of the stagnant coolant hot spots encountered in wire wrap designs.

2. Reduction of coolant resistance over the equivalent wire wrap. The dimpled strip is typically of the order of half the thickness of the equivalent wire. For example a 10mm diameter fuel pin with pitch to diameter ratio of 1.1 would employ a 1mm diameter spacing wire while the equivalent dimpled strip may be 0.4mm thick with 0.4mm proud dimples and a 0.2mm proud rib.

3. The introduction of desirable resilience into the spacing arrangement since the strip is able to bend elastically when contacted by neighbouring fuel elements at points intermediate pairs of dimples. This is of importance in situations where the fuel elements are required to undergo high burn-up and consequent dilation during irradiation.

In the latter context, it is preferred that the thickness of the strip (ie in the undimpled and unribbed regions thereof) is less than the thickness of the fuel element cladding; for instance the strip thickness may be 0.4mm compared with 0.6mm cladding thickness. Typically, for fuel elements having a diameter of the order of 10mm, the strip may be 3mm in width and the dimples may be formed at intervals such that there is approximately 4mm flat strip between successive dimples in each series and the dimple-to-dimple spacing is of the order of 6mm.

I claim:

1. An improved nuclear reactor fuel element, wherein the improvement comprises, the fuel element being helically wrapped with a strip, the strip having on the face thereof presented towards the fuel element, spacer dimples which contact the cladding of the fuel element at positions spaced around the circumference of and spaced axially of the fuel element, and the strip having on the face thereof presented away from the fuel element a rib for contact with the cladding of neighbouring fuel elements.

2. A fuel element as claimed in claim 1, wherein the rib is located intermediate the edges of the strip, and the dimples are arranged in two series of dimples one on each side of the strip.

3. A fuel element as claimed in claim 2, wherein the dimples in each series are spaced apart at a regular pitch, and the dimples in one series are staggered relative to the dimples in the other series in a direction lengthwise of the strip, the stagger being such that, with the strip wrapped around the element, said dimples on opposite sides of the rib are aligned with one another axially of the fuel element.

4. A fuel element as claimed in claim 3, wherein the thickness of the strip is less than that of the cladding of the fuel element.

5. A fuel element as claimed in claim 4, wherein the strip is 0.4 mm thick and 3 mm wide and the cladding is 0.6 mm thick, the dimples are 0.4 mm proud and at a spacing of 6 mm, and the rib is 0.2 mm proud.

* * * * *